March 10, 1970 C. J. McMINN ET AL 3,499,831
COPPER AND FERROUS METAL CURRENT COLLECTOR AND ELECTROLYTIC
CELL THEREWITH
Filed Oct. 18, 1966 2 Sheets-Sheet 1

INVENTORS
CURTIS J. McMINN
VAUGHN L. BULLOUGH

BY Glenn, Palmer, Matthews + Lyne
ATTORNEYS

United States Patent Office 3,499,831
Patented Mar. 10, 1970

3,499,831
COPPER AND FERROUS METAL CURRENT
COLLECTOR AND ELECTROLYTIC CELL
THEREWITH
Curtis J. McMinn and Vaughn L. Bullough, Florence, Ala., assignors to Reynolds Metals Company, Richmond, Va., a corporation of Delaware
Filed Oct. 18, 1966, Ser. No. 587,526
Int. Cl. B01k 3/06; H01b 5/02
U.S. Cl. 204—243                  5 Claims

ABSTRACT OF THE DISCLOSURE

A current collector pin adapted to be electrically connected to a graphite cathode block in an electrolytic cell, such as an alumina reduction cell, by insertion into a socket in the block, comprises a tubular copper conductive member surrounding and in contact with a central reinforcing metal core extending therethrough, and an outer sleeve surrounding and extending over the portion of the length of the tubular member not inserted into the socket.

---

This invention relates to electrolytic reduction cells provided with a graphite cathode element and having improved current collector pins connected to the cathode. More particularly, the invention concerns current collector pins having coated and/or reinforced construction, and to cells provided with such collector pins.

Aluminum metal is conventionally produced in electrolytic cells by passing a current through a bath of molten cryolite, containing dissolved alumina, in a large tank lined with carbon which serves as part of the cathode system. Large carbon blocks presented at the top of the bath function as the anode. Molten aluminum metal at a temperature of about 1800° F. collects as a metal pad at the bottom of the cell and is siphoned off periodically. The cell may have a bottom lining in which horizontally disposed cylindrical or rectangular graphite cathode bars extend from the opposite sides of the cell. These cathode bars are connected to the cathode collector system by metal pins, the pins and the pin-connected ends of the graphite cathodes being anchored in a side lining of rammed carbon.

Copper collector pins used in conjunction with graphite cathode blocks, while providing a low resistance joint to the cathode graphite, exhibit low strength at the temperatures to which the metal is exposed, namely about 750° C. to 950° C. Certain types of copper, such as electrolytic tough pitch grade copper, contain small amounts of oxygen or other gases which expand at elevated temperatures, producing voids and weakening the metal structure. Although steel has been proposed as a pin material, the use of steel pins is also disadvantageous because the steel-graphite interface has a much higher electrical resistance than copper-graphite, especially at low contact pressure.

Thus, it is a primary object of the invention to provide a high strength collector pin in which the low resistance copper-graphite contact is fully preserved.

The foregoing objects are attained, in accordance with the invention, and the benefits of the low resistance copper-graphite contact are preserved, in both of two embodiments of the invention. In the first embodiment, the copper pin is reinforced with a central core of steel or other suitable alloy having high temperature strength. In the second embodiment, a coating of copper, thick enough to obtain the contact characteristics of copper, is applied to the exterior surface of a pin made of steel or a suitable ferrous alloy.

In accordance with the invention, there is further provided an alumina reduction cell comprising a shell, a graphite cathode block supported on the shell, and a collector pin of the character described electrically connected to the cathode block, the block containing a socket at its outwardly-facing end adapted to receive the collector pin. The pin may be connected to the cathode block by either a smooth or a threaded connection. The joints between graphite cathode blocks and the collector pins are not accessible after the reduction cell has been placed in operation, and the pin constructions of the present invention permit the joints to retain high conductivity while avoiding all danger of fracture of the graphite blocks.

The invention will be more readily understood by reference to the accompanying drawings which illustrate present preferred embodiments, wherein.

Figure 1:
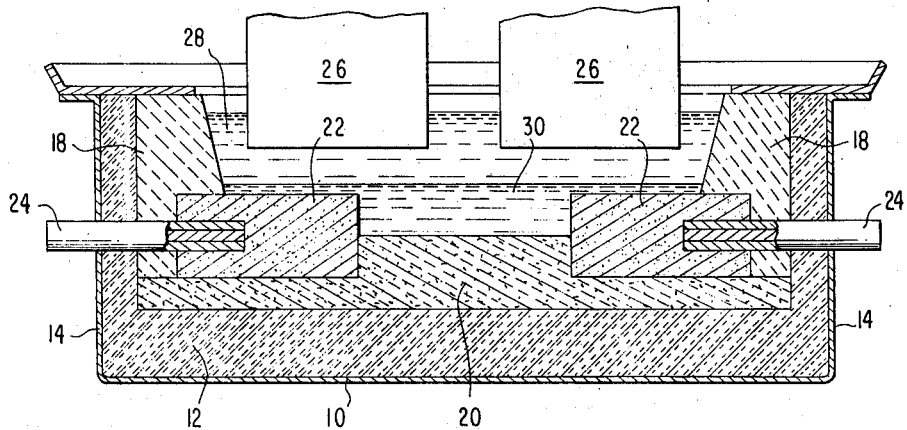
FIGURE 1 is a sectional elevation of an alumina reduction cell incorporating the pins of the invention.

Referring to FIGURE 1, there is shown an alumina reduction cell having a steel shell 10, the bottom wall of which is covered with a lining of insulating material 12 extending around the walls 14. The side walls are also lined interiorly with carbon 18, in conventional manner, and the interior bottom lining is composed of a suitable refractory material 20 such as a cryolite-alumina mixture. Cathode blocks 22 of graphite are connected to the cathode collector system by collector pins 24 of the reinforced type in accordance with the invention. The pin-connected ends of cathode blocks 22 are anchored in side lining 18, and the remaining portions are embedded, except for their exposed upper surface, in the lining 20. A cluster of prebaked carbon anodes 26 is suspended over the cell, the lower surfaces of the anodes being in contact with a bath 28 of molten alumina and cryolite. A pad 30 of molten aluminum extends beneath the bath 28, covering insulative layer 20 and the exposed upper surfaces of cathode blocks 22.

The copper conductive element shown in the various embodiments of the invention depicted in the drawings is a high conductivity grade of copper, preferably a deoxidized copper, such as oxygen-free grade copper, which is 99.96–99.99% Cu, or boron-deoxidized copper. Phosphorous-deoxidized copper may also be employed, but has less favorable conductivity properties.

Figure 2:
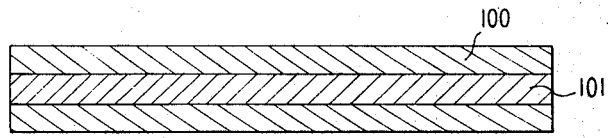
FIGURE 2 is a longitudinal section of one form of the reinforced collector pin of the invention.

FIGURE 2 shows the reinforced collector pin of the invention in its simplest form. The pin comprises a copper tube 100 fitted around a reinforcing bar or stud 101, the assembly being adapted to be inserted into a cathode block via a smooth connection.

Figure 3:
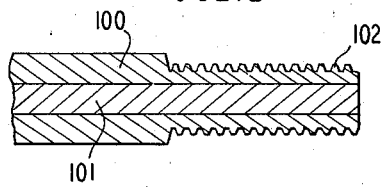
FIGURE 3 is a longitudinal section of the reinforced pin of FIGURE 2 provided with a threaded end.
Figure 4:
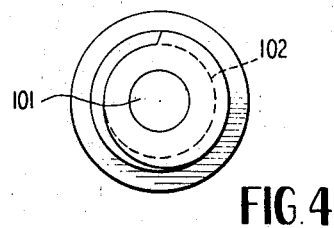
FIGURE 4 is an end view of the threaded pin of FIGURE 3 at the threaded end.

FIGURE 3 shows a reinforced collector pin of the same type as in FIGURE 2, but provided with a screw thread 102. An acme type thread has proved advantageous in that it provides low resistance contact at both low and high temperatures, and also prevents intrusion of alumina and other foreign materials between the copper and the graphite. FIGURE 4 shows an end view of the threaded end of the pin of FIGURE 3, which is adapted to be screwed into a threaded socket in the graphite block to which the pin is to be connected.

In the various embodiments of the reinforced type of pin, the reinforcing rod is made of a metal having high temperature strength, such as, for example, mild steel (SAE 1020), stainless steel, or an alloy of nickel and chromium commercially available under the designation RA 333 and having the nominal composition: 45% Ni, 25% Cr, 1.25% Si, 3% Mo, 3% W, 3% Co, 18% Fe, and 1.5% Mn.

Figure 5:
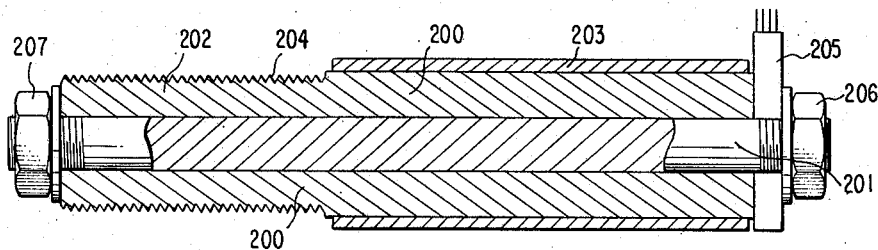
FIGURE 5 is a longitudinal section of the reinforced pin assembly of another form of the reinforced pin.

A more elaborate embodiment of the reinforced collector pin is depicted in FIGURE 5. Here the pin comprises a copper conductive tubular body 200 fitted around a central reinforcing rod 201 which extends beyond the length of the copper body. The reinforcing rod 201 aids in keeping the copper pin under compression. A steel or alloy sleeve 203 extends over a portion of the length of the copper body and provides rigidity, and also protects the copper from the environment. The pin end 202 adapted for insertion into the cathode block may be provided with a light thread 204 for more secure connection with the cathode block. The pin is provided, for purposes of electrical connection, with a flexible copper tab 205, which is welded to the main copper body 200. The assembly is secured by suitable fastening means 206 and 207, such as a washer and hex nut.

Where oxygen-free copper is employed for the copper body, it may be either of the two types presently commercially available: OFHC Brand Copper (minimum Cu 99.96%, P less than 3 p.p.m., Zn less than 10 p.p.m., Hg less than 1 p.p.m., S less than 40 p.p.m.), and Certified OFHC Brand Copper (99.99% Cu, P less than 3 p.p.m., Zn less than 1 p.p.m., Pb less than 10 p.p.m., Hg less than 1 p.p.m., S less than 18 p.p.m., Cd less than 1 p.p.m., sum of As, Sb, Bi, Se, Te, Sn, Mn not exceeding 40 p.p.m.), sold by Americal Metal Climax, Inc., New York, N.Y. Both these types of copper meet the ASTM specifications B 170–59 for oxygen free copper. They are produced by electrolytic refining employing special anodes to form cathodes which are then cast under conditions which prevent oxygen contamination.

Figure 8:
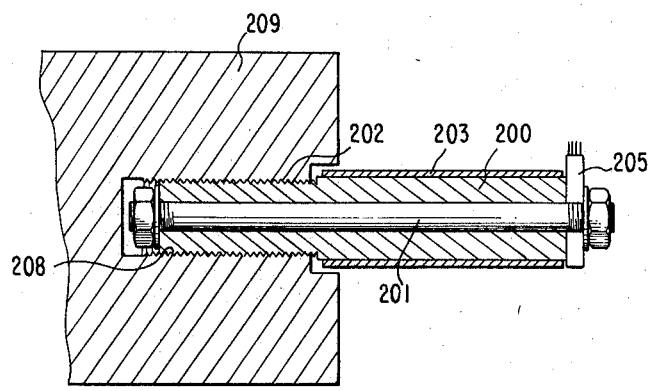
FIGURE 8 is a sectional elevation of a graphite cathode block receiving the collector pin shown in FIGURE 5.

In FIGURE 8, the reinforced collector pin of the sheathed type is shown inserted into a graphite cathode block. The threaded pin end 202 is screwed into threaded socket 208 in the graphite block 209, being thus automatically positioned and held in place in the graphite. The copper contacts the carbon of the cathode forming a connection with the low electrical resistance. The reinforcing rod 201 prevents the copper from being broken by mechanical stresses that develop in the cathode.

Figure 6:
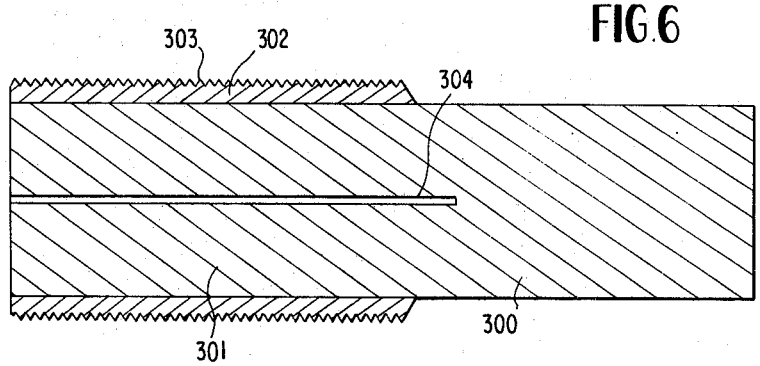
FIGURE 6 is a longitudinal section of the copper coated steel collector pin of the invention.

In accordance with an alternative embodiment of the invention, a high strength collector pin is provided which preserves the desirable low resistance copper-graphite contact. As shown in FIGURE 6, this embodiment comprises a steel or alloy pin 300 which is provided at its contact end 301 with a coating 302 of copper. The copper coating, which is preferably made of the conductive types of copper previously described, namely oxygen-free, or deoxidized copper, may be applied to the surface of the rod or pin 300 by cladding, spraying, flame spraying followed by diffusion bonding, furnace brazing, plating, impact welding, shrink fitting followed by diffusion bonding, or other suitable means. The copper coating should be sufficiently thick to provide the desired low resistance contact. Thus, a copper coating of the order of 0.125″ thickness bonded or diffused to the high strength pin is capable of lowering contact voltage loss by about 50 mv. In general, the coating thickness should be between about 0.1″ and 0.2″. This is to be distinguished from a plated article in which the plating is usually only a few mils in thickness.

Figure 7:
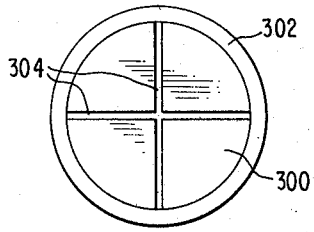
FIGURE 7 is an end view of the pin of FIGURE 6 at the end to be inserted into the cathode block.

In the embodiment shown in FIGURES 6 and 7, the coated type pin is further provided at its contact end with slots 304 which provide relief from thermal expansion. When the pin is to be inserted into a socket in a graphite cathode block, the socket is ordinarily the same diameter as the pin with the slots fully open. The end of the pin is then compressed slightly, partially closing the slots, and the pin inserted into the block. The resulting spring action provides the low pressures required for low resistance contact. The slots are shaped to provide expansion relief during heating while maintaining contact pressure. Fine threads 303 may be applied to the copper coat for additional expansion relief and to improve electrical contact.

The use of the collector pins of the invention in conjunction with graphite cathode blocks results in reduction of cathode voltage losses and hence in improved cell efficiency. Four of the reinforced and sheathed collector pins of the type shown in FIGURE 5 were tested for 80 days in a 10,000 ampere, graphite cathode alumina reduction cell. The pins employed nickel alloy reinforcing rods and external steel sheathing. The copper portions were made of oxygen-free copper. In operation, the copper-graphite contact resistance was about one-half the normal steel-graphite contact resistance (35 mv. voltage drop at normal current densities instead of 70 mv.). The copper-graphite contact resistance did not increase with time. The copper was in good condition after the test, micrographic examination revealing only some grain growth, slight gas porosity and minor penetration by bath materials.

A similar 10,000 ampere reduction cell test of the copper coated steel collector pins of the invention, shown in FIGURES 6 and 7, was of 90 days duration. The pins were in excellent condition and performing satisfactorily at the end of the test period. The pin of the invention was also operated in parallel with steel collector pins of two different designs. During the first month of test, voltage probes indicated a lower cathode-pin voltage drop with the copper coated pin of the invention than with a similar design all steel pin with no copper. The contact voltage drop with the copper coated pin was about 20 mv. compared to 35 mv. for the steel pin of similar design but without the copper coating. A tapered, slotted steel pin had a contact drop of about 50 mv.

What is claimed is:

1. A current collector pin adapted to be electrically connected to a graphite cathode block in an electrolytic cell by insertion into a socket in said block, said pin comprising a tubular copper conductive element surrounding and in contact with a rigid central reinforcing ferrous metal core extending through and protruding beyond the ends of said tubular element, and a rigid outer sleeve of ferrous metal surrounding and extending over the portion of the length of said tubular element not inserted into said socket, said central metal core being provided with a screw thread at each protruding end which engages threaded fastening means to secure the pin assembly, said copper conductive element having a short portion adapted for insertion into frictional engagement with said cathode block socket 2. The collector pin of claim 1 in which said fastening means comprises a washer and hex nut.

3. The collector pin of claim 1 which is provided for purpose of electrical connection with a flexible copper tab at the outer end of the pin.

4. A graphite cathode block adapted for use in an electrolytic alumina reduction cell, said block having electrically connected thereto the collector pin of claim 1, said block being provided with a socket receiving said collector pin.

5. An electrolytic cell comprising a pot shell, at least one graphite cathode block supported in said shell, and a current collector pin as claimed in claim 1 electrically connected to said block, said block being provided with a socket to receive said collector pin.

References Cited

UNITED STATES PATENTS

| | | | |
|---|---|---|---|
| 309,439 | 12/1884 | Chillingworth et al. | 29—191.6 |
| 309,509 | 12/1884 | Paul et al. | 29—191.6 |
| 1,891,943 | 12/1932 | Nimick | 29—191.6 X |
| 2,055,948 | 9/1936 | Selquist | 29—191.6 X |
| 2,377,164 | 5/1945 | Lowit | 29—191.6 |
| 3,179,736 | 4/1965 | Ramsey | 204—243 X |
| 3,390,071 | 6/1968 | McMinn et al. | 204—67 X |
| 1,279,192 | 9/1918 | Wheeler. | |

ALLEN B. CURTIS, Primary Examiner

U.S. Cl. X.R.

29—191.6; 174—126; 204—279; 339—268